United States Patent [19]

MacKenzie

[11] 4,324,411
[45] Apr. 13, 1982

[54] IMPLEMENT LEVEL LIFT SYSTEM

[75] Inventor: Hugh J. MacKenzie, Ancaster, Canada

[73] Assignee: International Harvester Company, Chicago, Ill.

[21] Appl. No.: 156,892

[22] Filed: Jun. 5, 1980

[51] Int. Cl.³ .............................................. A01B 63/22
[52] U.S. Cl. .................................. 280/43.23; 91/515; 137/99; 172/413
[58] Field of Search ............... 280/43.23, 43.17, 43.13; 172/2, 4, 413, 401, 406; 91/514, 515, 517, 518, 532; 60/420, 374; 137/99

[56] References Cited

U.S. PATENT DOCUMENTS 3,065,602  11/1962  Curlett .............................. 60/420 X
3,495,610  2/1970  Van Aken ............................ 137/99

FOREIGN PATENT DOCUMENTS 792519  8/1968  Canada .................................. 172/401

*Primary Examiner*—John A. Pekar
*Attorney, Agent, or Firm*—F. David AuBuchon

[57] ABSTRACT

A level lift system for an implement in which a main frame is flexibly connected to outrigger frames with a wheel assembly carried by each frame. A hydraulic ram is operably connected between each frame and the associated wheel assembly with the rams connected in parallel and with a rotary flow divider interposed in the connection with one end of said rams, whereby fluid pressure is directed to said one end when connected with a pump and fluid is exhausted from said one end when connected with a reservoir. Flow to and from said one end being at substantially equal rates regardless of the relative resistance encountered by said rams.

4 Claims, 2 Drawing Figures

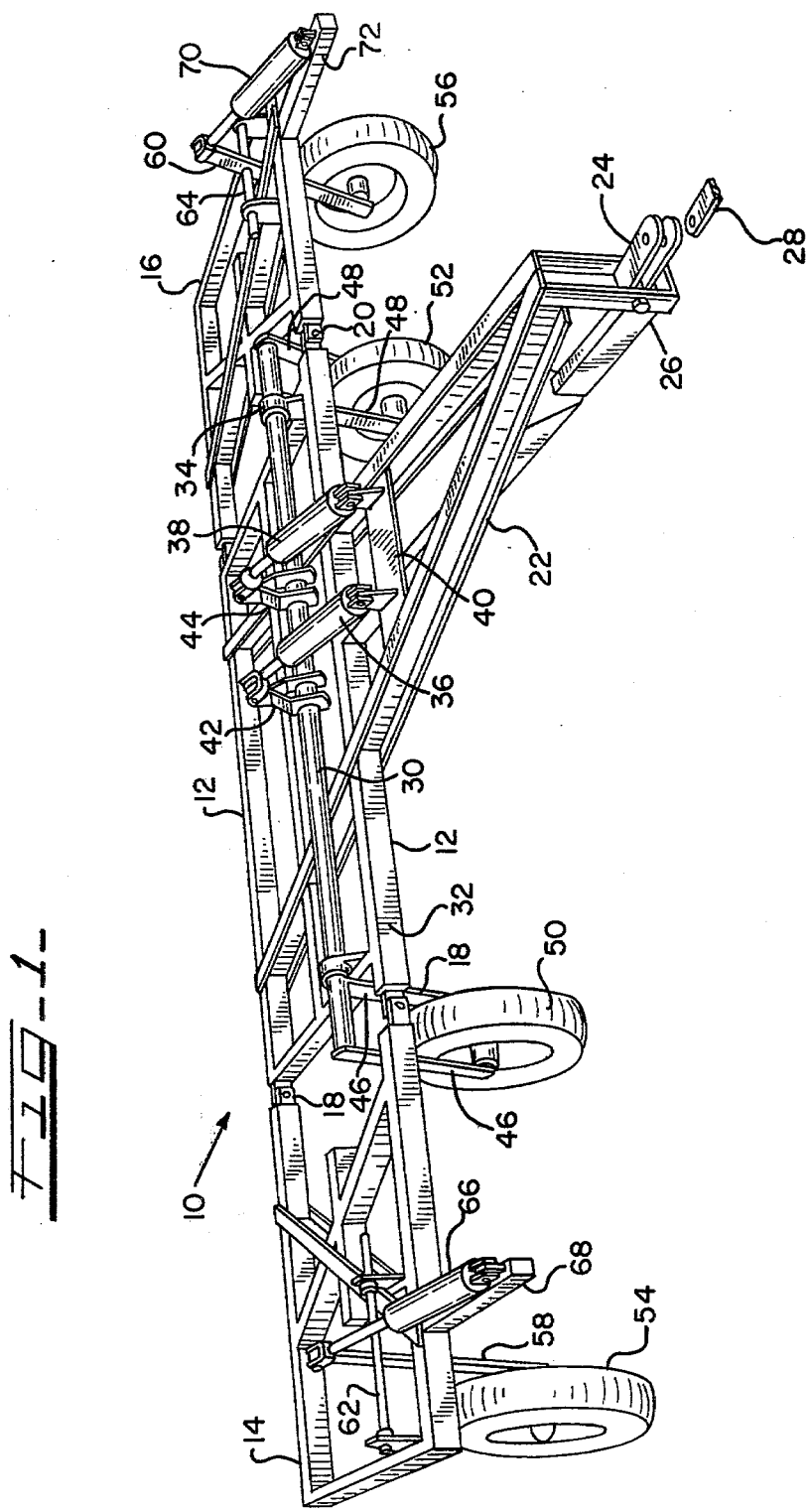

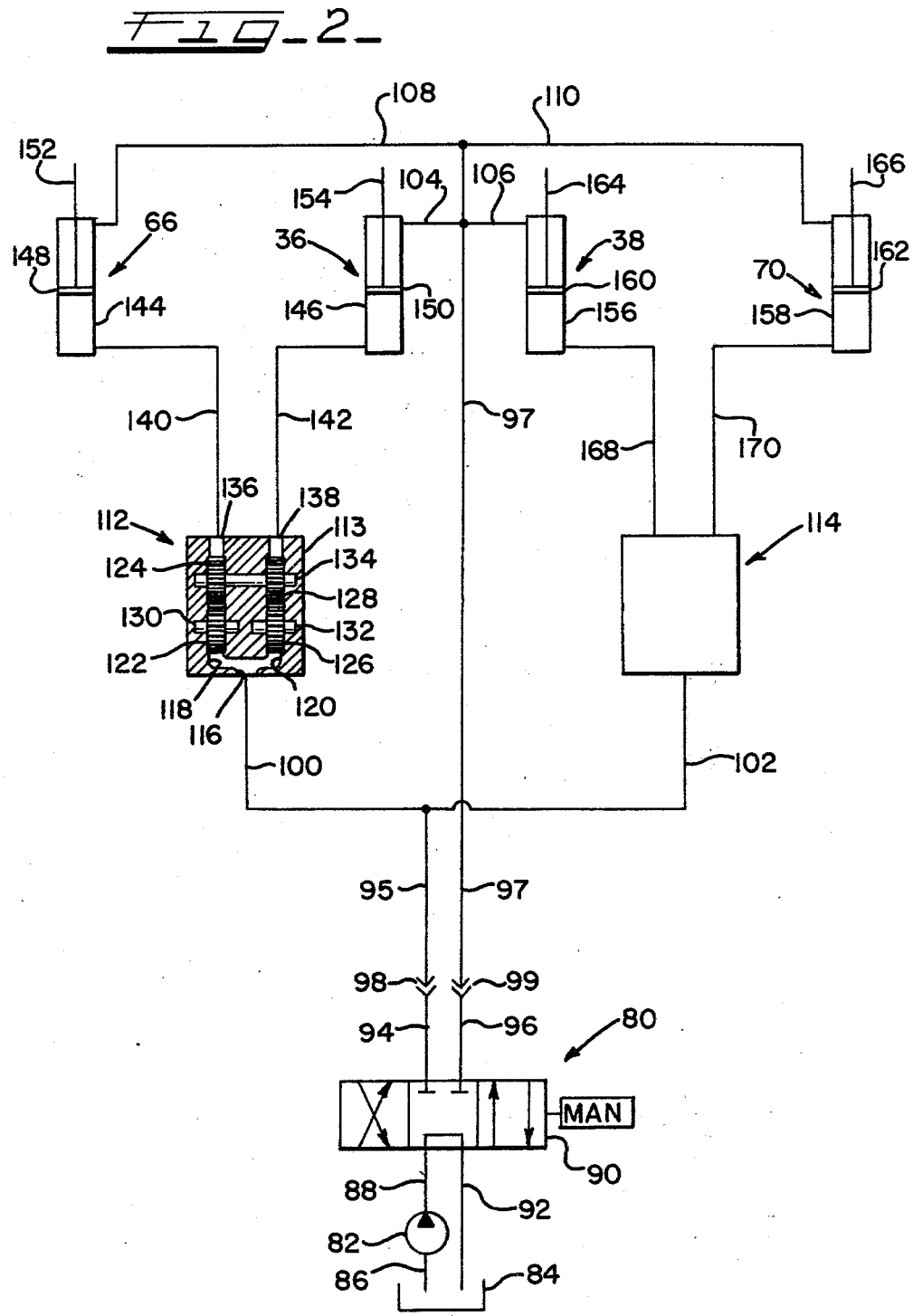

IMPLEMENT LEVEL LIFT SYSTEM

BACKGROUND AND SUMMARY OF THE INVENTION

Since hydraulic fluid will inherently seek the flow path of least resistance, implements composed of hinged or flexibly connected frames, or implements having rigid frames with non-uniform loading, which are raised and lowered by hydraulic rams connected in parallel usually will not remain level as their elevation is changed. Prior art attempts to overcome this problem have generally concentrated on the use of master-slave arrangements connected in series. However, master-slave arrangements require special cylinders, the necessary structure of which is often not consistent with what is generally regarded as good hydraulic design practice. Specifically, the seal of the piston must pass over an orifice, which is not desirable as it tends to accelerate wear on the seal. In addition, the tolerances normally encountered in manufacture can cause plastic or permanent deformation in the implement frame due to the excess stroking required to achieve rephasing. The master-slave arrangement also amounts to a closed system and all air must be bled from that system for it to function properly. Bleeding such a system is often a troublesome and time consuming chore.

It is, therefore, an object of this invention to provide a level lift system for an agricultural implement which is capable of utilizing conventional hydraulic rams, which is less likely to cause distortion or deformation of the implement frame, and which minimizes the necessity for bleeding the hydraulic system with which it is associated.

It is also an object of this invention to provide a level lift system in which rephasing occurs automatically without the need for any one of the cylinders to go to the limit of its stroke.

These and other objects of the present invention and many of the attendant advantages thereof, will become more readily apparent upon a perusal of the following description and the accompanying drawings, wherein:

FIG. 1 is a pictorial view of an implement frame incorporating a lift system according to the present invention; and FIG. 2 is a hydraulic schematic of the system utilized on the implement of FIG. 1 according to the present invention.

DESCRIPTION OF A PREFERRED EMBODIMENT

Referring now to FIG. 1, there is shown an implement, indicated generally at 10, including a main frame 12 and a pair of outrigger or wing frames 14 and 16. The outrigger frame 14 is pivotally attached to the main frame 12 by means of pivot pins 18 which define an axis of articulation for the outrigger frame 14 on the frame 12. Similarly, the outrigger frame 16 is pivotally attached to the main frame 12 by pivot pins 20 defining a pivot axis for articulation of the outrigger frame 16 relative to the main frame 12. A forward extending tongue 22 is secured to the main frame 12. A clevice 24 is pivotally secured to the front of the tongue 22 by means of pivot pin 26. Connection of the implement 10 to a tractor is effected by insertion of the drawbar 28 into the clevice 24 and insertion of a clevice pin through the aligned holes therein.

A rock shaft 30 is rotatably mounted on the main frame 12 by journaled supports 32 and 34. A pair of hydraulic rams 36 and 38 are pivotally secured at one end to a plate 40 affixed to the tongue 22 of the main frame 12. The other end of the rams 36 and 38 are pivotally attached to crank arms 42 and 44 respectively, which crank arms are attached to the rock shaft 30 and rotated with it. Axle-supporting, paired arms 46 and 48 are secured to opposite ends of the rock shaft 30 and rotatably carry ground-engaging wheels 50 and 52 respectively.

A similar arrangement is provided to support the outrigger frames 14 and 16 on wheels 54 and 56 respectively, the wheels 54 and 56 being journaled on an axle supported by levers 58 and 60 respectively. The levers 58 and 60 are each secured intermediate their lengths to shafts 62 and 64 respectively, which shafts are rotatably mounted on their associated outrigger frames 14 and 16. Hydraulic ram 66 is pivotally attached between the upper portion of lever 58 and a rigid extension 68 of the outrigger frame 14. Similarly, hydraulic ram 70 is pivotally attached between the upper portion of lever 60 and a rigid extension 72 of the outrigger frame 16.

It will be apparent from the foregoing, that simultaneous extension of the rams 36, 38, 66 and 70 will cause the implement 10 to be elevated further from the ground with which the wheels 50, 52, 54 and 56 are in engagement. Similarly, contraction of these rams will lower the implement frames so that they are closer to the ground. The cylinders 36 and 38 therefor control the height of the main frame 12 above the ground while the rams 66 and 70 control the height of the frames 14 and 16 respectively above ground. Unless the cylinders 66 and 70 extend or contract in unison with the cylinders 36 and 38, the outrigger frames 14 and 16 will not remain at the same level with the main frame 12. The maintaining of a level condition during the lift is achieved by the circuit shown in FIG. 2.

A hydraulic system indicated generally at 80 in FIG. 2 would be provided on the tractor to which the drawbar 28 is mounted. For simplicity, the hydraulic system 80 in FIG. 2 is shown as including a pump 82 which draws fluid from a reservoir 84 through intake conduit 86 and discharges fluid pressure through conduit 88. The conduit 88 connects with a valve 90, which as illustrated is of the open center type with fluid being returned therefrom to the reservoir 84 to conduit 92. A pair of conduits 94 and 96 connect with the valve 90 and with the hoses or conduits 95 and 97 respectively on the implement 10 through conventional hydraulic connectors 98 and 99. Conduit 95 branches into conduits 100 and 102, and the conduit 97 into conduits 104, 106, 108 and 110. Conduits 100 and 102 communicate with a port in the rotary flow dividers 112 and 114 respectively.

The two rotary flow dividers 112 and 114 are conventional and identical in structure. Hence, a brief explanation of the structure and operation of one rotary flow divider will suffice for an understanding of both. The rotary flow divider 112 has a valve body 113 which is provided with a port 116. The port 116 branches into chambers 118 and 120. A pair of meshing gears, 122 and 124 are positioned in chamber 118 and a similar pair of meshing gears 126 and 128 are provided in chamber 120. The gears 122 and 126 are independently rotatable on or with shafts 130 and 132 respectively. The gears 124 and 128 are secured to and both are rotatable with the shaft 134, which shaft is rotatably mounted in valve body 113. Ports 136 and 138 respectively communicate with the opposite ends of chambers 118 and 120 and connect with conduits 140 and 142. The chambers 118 and 120 are contoured and shaped in the vicinity of the gears, so that the meshing gears 122 and 124 and gears 126 and 128 may function in a manner similar to a gear pump or motor. Flow of hydraulic fluid in either direction through one of the chambers 118 or 120 will cause the gear set in that chamber to rotate. The gear set in the other chamber will also rotate at the same rate and in the same direction because the gears 124 and 128 are secured to a common shaft 134. Thus the gear set in the other chamber will act as a pump, thereby assuring fluid flow to the other chamber at substantially the same rate and in the same direction as fluid flow through the one chamber.

The rams 36 and 66 respectively include a cylinder 144 and 146 reciprocably carrying a piston 148 and 150 with attached rods 152 and 154. The conduits 140 and 108 connect with the head end and rod end of cylinder 144 respectively, and the conduits 142 and 104 connect respectively with the head end and rod end of cylinder 146. The rams 38 and 70 respectively include a cylinder 156 and 158 reciprocably carrying a piston 160 and 162 with attached rods 164 and 166. Conduits 168 and 170 extend between the rotary flow divider 114 and the head end of cylinders 156 and 158 respectively. Branch conduits 106 and 110 respectively connect with the rod end of cylinders 156 and 158.

With the valve 90 in the position shown, the conduits 94 and 96 are blocked and the rams 36, 38, 66 and 70 are effectively hydraulically locked. Shifting the valve 90 to the left connects conduit 88 with conduit 94 and conduit 96 with the conduit 92. Hydraulic fluid pressure from the pump 82 is therefore directed to branch conduits 100 and 102 through the rotary flow dividers 112 and 114 and into conduits 140, 142, 168 and 170. The pistons in these respective rams, 148, 150, 160 and 162 are moved upward, as viewed in FIG. 2, causing the rods 152, 154, 164 and 166 to be extended. Fluid expelled from the rod end of the cylinders, 144, 146, 156 and 158 is directed into conduits 108, 104, 106 and 110, and through their connection with conduit 97 to the reservoir 84 through conduits 96 and 92. Should one of the rams 36, 38, 66 or 70 encounter a greater resistance to its movement, the fluid pressure from the pump 82 would normally go to those cylinders which have a lighter load because the hydraulic fluid inherently seeks the path of least resistance. For example, if ram 66 encounters a heavier load than is encountered by ram 36, the fluid flow through the chamber 120 will cause the gears 126 and 128 to rotate, which will in turn rotate the shaft 134 and gear 124 in chamber 118. Rotation of the gear 124, which is meshed with gear 122, will pump fluid through chamber 118 into conduit 140. The flow rate will be substantially identical even though the pressure in the head end of cylinder 144 may be higher than the pressure in the head end of cylinder 146, and the two rams 36 and 66 will be extended at substantially the same rate. The same is true with respect to the cylinders 38 and 70. The flow divider 114 will assure that both rams 38 and 70 will be extended at the same rate.

The gears in the flow divider 112 have a relatively close tolerance with the chambers in which they rotate. However there will be a small clearance or bypass between the sides of the gears and the sidewalls of the chambers 118 and 120. This small clearance will permit sufficient leakage to allow a rephasing of the rams. For example, if ram 36 should reach the limit of its stroke before ram 66 reaches its limit, flow through chamber 120 would no longer be possible because the head end of cylinder 146 can accept no further volume of fluid. Since the gears 126 and 128 cannot rotate, shaft 134 will be held stationary and with the gears 122 and 124 in chamber 118 will also be held from rotating. However, the small leakage around the sides of the gears 122 and 124 will permit the ram 66 to complete its stroke.

The movement of the valve 90 to the right, as viewed in FIG. 2, will connect conduit 88 with the conduit 96 and the conduit 94 with the conduit 92. Thus, hydraulic fluid pressure from the pump 82 will be directed through conduit 97 and branch conduits 104, 106, 108 and 110 to the rod end of cylinders 146, 156, 144 and 158 respectively. The rams 36, 38, 66 and 70 will therefore be contracted and the fluid expelled from the head end of their respective cylinders will be directed through conduits 140 and 142 into flow divider 112 and through conduits 168 and 170 into flow divider 114. The flow through the respective flow dividers 112, 114 will be uniform in their two chambers for the same reason that it is when the cylinders are extended, as explained previously, and the flow will be combined into conduits 100 and 102 and from there into conduits 95, 94, and 92 to the reservoir 84. Rephasing of the cylinders 36, 66, 38 and 70 is also effected as these rams are contracted for the same reason as described previously. That is, the leakage of the fluid around the gears permits the rams to be contracted fully.

It should be noted that the two rams 36 and 38 are mechanically interconnected through the rock shaft 30. As a consequence, these two rams 36 and 38 will always remain in phase and will move in unison regardless of the lateral weight distribution of the main frame 12. Since the ram 66 moves in unison with the ram 36 because of the rotary flow divider 112, and ram 70 with the ram 38 because of the rotary flow divider 114, all four of the rams 66, 36, 38 and 70 will move in unison. The entire implement 10 will remain level, assuming the ground upon which it rests is level, as these rams are extended and contracted to respectively raise and lower the implement relative to the ground.

For large implements, i.e., implements that span a relatively long distance transverse to the longitudinal or fore-and-aft centerline of the tractor, it is necessary to provide the winged or outrigger frames in order to permit the implement to accommodate undulations in the contour of the ground over which the implement is passing. However, with smaller implements such accommodation is not necessary because drastic changes in ground contour in a short span is less likely and because the weight of the smaller implement can be properly supported on two wheels. In such a case, a rigid frame will suffice, and a circuit that achieves level lift with automatic rephasing is provided by either the right or left side of that shown in FIG. 2. For example, a rigid frame implement could be supported on two wheels with the rams 36 and 66 connected thereto in a manner similar to the connection of ram 66 to wheel 54. The flow divider 112 and the conduits 100, 140 and 142 connecting it with the valve 90 and with the cylinders 144 and 146 and the conduits 97, 104, and 108 is all that would be required to provide level lift with rephasing for the rigid frame as explained earlier.

With either a rigid or a winged frame, rephasing can be achieved at less than full stroke of the cylinders, a function that cannot be achieved with a master-slave arrangement. For example, if a minimum height for the implement is desired, a clamp or other stop device could be affixed to the rods 152, 154, 164 and 166 of the rams 66, 36, 38 and 70 to physically preclude further contraction of the rams upon the stop engaging the end of the cylinders 144, 146, 156 and 162. Should one of the stop devices contact the adjacent end of its cylinder before the other, the associated ram will not be able to contract any further. Nevertheless, the other rams will continue contracting until each has reached its stop due to leakage around the gears in the flow divider. Of course, the exception to this statement is the two mechanically connected rams 36 and 38. The only possible movement of these rams 36 and 38, once one of these has encountered such a stop device, is through torsional deflection of the rock shaft 30, which deflection would be minimal.

While preferred embodiments of the present invention have been shown and/or described herein, various changes and modifications may be made therein without departing from the spirit of the invention as defined by the scope of the appended claims.

What is claimed is:

1. An agricultural implement carrier comprising:
   a rigid main frame;
   a first outrigger frame pivotally connected to said main frame;
   a first wheel assembly pivotally mounted on said main frame;
   a second wheel assembly pivotally mounted on said first outrigger frame;
   a first hydraulic ram operatively connected with said main frame and said first wheel assembly to raise and lower said main frame;
   a second hydraulic ram operatively connected with said outrigger frame and said second wheel assembly to raise and lower said first outrigger frame;
   said rams hydraulically connected in parallel;
   a first rotary flow divider hydraulically connected with said rams for assuring equal flow of hydraulic flow to and from said rams whereby said frames are raised and lowered in unison;
   ram rephasing means directly communicating with said rams for equalizing operation of said rams when one of them reached its rod displacement limit; and
   said ram rephasing means comprising a flow divider gear by-pass facilitating completion of another ram rod displacement.

2. The invention according to claim 1, wherein said ram rephasing means comprises stop means mounted on each of said rams for individual adjustment of each ram rod displacement limit.

3. The invention according to claim 1 and further comprising:
   a second outrigger frame pivotally connected to said main frame opposite said first outrigger frame;
   a third hydraulic ram operatively attached between said main frame and said first wheel assembly, said first and third hydraulic rams being mechanically interconnected to move said second wheel assembly in unison;
   a third wheel assembly mounted on said second outrigger frame;
   a fourth hydraulic frame operatively attached to said third wheel assembly to raise and lower said second outrigger frame;
   said third and fourth hydraulic rams connected in parallel therebetween and with said first and second rams; and
   a second rotary flow divider for assuring equal flow of hydraulic fluid to and from said third and fourth rams thereby facilitating coplanar vertical displacement of said frames.

4. An implement carrier comprising:
   a main frame;
   a first outrigger frame pivotally connected to said main frame;
   a first wheel assembly mounted on said main frame;
   a second wheel assembly mounted on said first outrigger frame;
   a first hydraulic ram operatively attached between said main frame and said first wheel assembly to raise and lower said main frame;
   a second hydraulic ram operatively attached between said outrigger frame and said second wheel assembly to raise and lower said first outrigger frame;
   said rams connected in parallel; and
   a first rotary flow divider for assuring equal flow of hydraulic flow to and from said rams whereby said frames are raised and lowered in unison;
   a second outrigger frame pivotally connected to said main frame opposite said first outrigger frame;
   a third hydraulic ram operatively attached between said main frame and said first wheel assembly, said first and third hydraulic rams being mechanically interconnected to move said second wheel assembly in unison;
   a third wheel assembly mounted on said second outrigger frame;
   a fourth hydraulic ram operatively attached to said third wheel assembly to raise and lower said second outrigger frame;
   said third and fourth hydraulic rams connected in parallel; and
   a second rotary flow divider for assuring equal flow of hydraulic fluid to and from said third and fourth rams whereby said frames are raised and lowered in unison.

* * * * *